United States Patent
Nishida et al.

(10) Patent No.: US 6,443,576 B1
(45) Date of Patent: Sep. 3, 2002

(54) PROJECTOR

(75) Inventors: Kazuhiro Nishida, Matsumoto; Tomiyoshi Ushiyama, Minowa-machi, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/481,441

(22) Filed: Jan. 13, 2000

(30) Foreign Application Priority Data

Jan. 14, 1999 (JP) ............................................. 11-007393
Sep. 8, 1999 (JP) ............................................. 11-253779

(51) Int. Cl.⁷ ............................................. G03B 21/28
(52) U.S. Cl. ............................................. 353/98; 353/38
(58) Field of Search ............................. 353/38, 31, 34, 353/37, 98, 84, 99; 348/755, 764, 771, 742, 743; 349/5.8

(56) References Cited

U.S. PATENT DOCUMENTS

| | | | |
|---|---|---|---|
| 5,098,184 A | * 3/1992 | van den Brandt et al. | 353/102 |
| 5,418,583 A | 5/1995 | Masumoto | |
| 5,921,650 A | * 7/1999 | Doany et al. | 353/31 |
| 6,030,082 A | * 2/2000 | Yamamoto | 353/38 |
| 6,062,695 A | * 5/2000 | Kakuda et al. | 353/38 |
| 6,099,128 A | * 8/2000 | Jessl | 353/31 |

FOREIGN PATENT DOCUMENTS

| | | |
|---|---|---|
| GB | 2 324 166 A | 10/1998 |
| JP | 10-115870 | 5/1988 |
| JP | 9-160034 | 6/1997 |
| JP | 9-171150 | 6/1997 |
| JP | 10-95380 | 4/1998 |
| JP | 10-170869 | 6/1998 |
| JP | 10-293268 | 11/1998 |
| JP | 11-2780 | 1/1999 |
| JP | 11-271706 | 10/1999 |

\* cited by examiner

Primary Examiner—William Dowling
(74) Attorney, Agent, or Firm—Oliff & Berridge, PLC

(57) ABSTRACT

The invention achieves a reduction in size of a projector by shortening a length of an optical path of an illuminating optical system in a projector using an emitting direction control-type optical modulation device as compared to that of a conventional illuminating optical system, and thus, improves the illumination efficiencies of the illuminating optical system. An illuminating optical system includes a light source, a first lens array having a plurality of first small lenses for dividing light emitted from the light source into a plurality of partial light beam fluxes, and a second lens array having a plurality of second small lenses corresponding to the plurality of first small lenses. In addition, the illuminating optical system includes an optical element such that an outline shape of an emitting surface is a quadrilateral having first and second diagonal lines of different lengths. The quadrilateral of the optical element is set so that the ratio of two diagonal lines of a quadrilateral illumination region to which the illumination light is applied comes closer to 1 than the ratio of the lengths of the first and second diagonal lines.

15 Claims, 12 Drawing Sheets

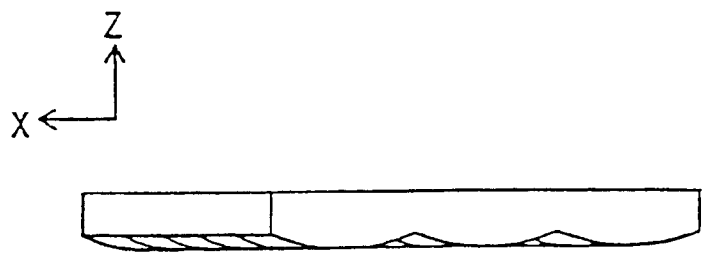
Fig. 6B
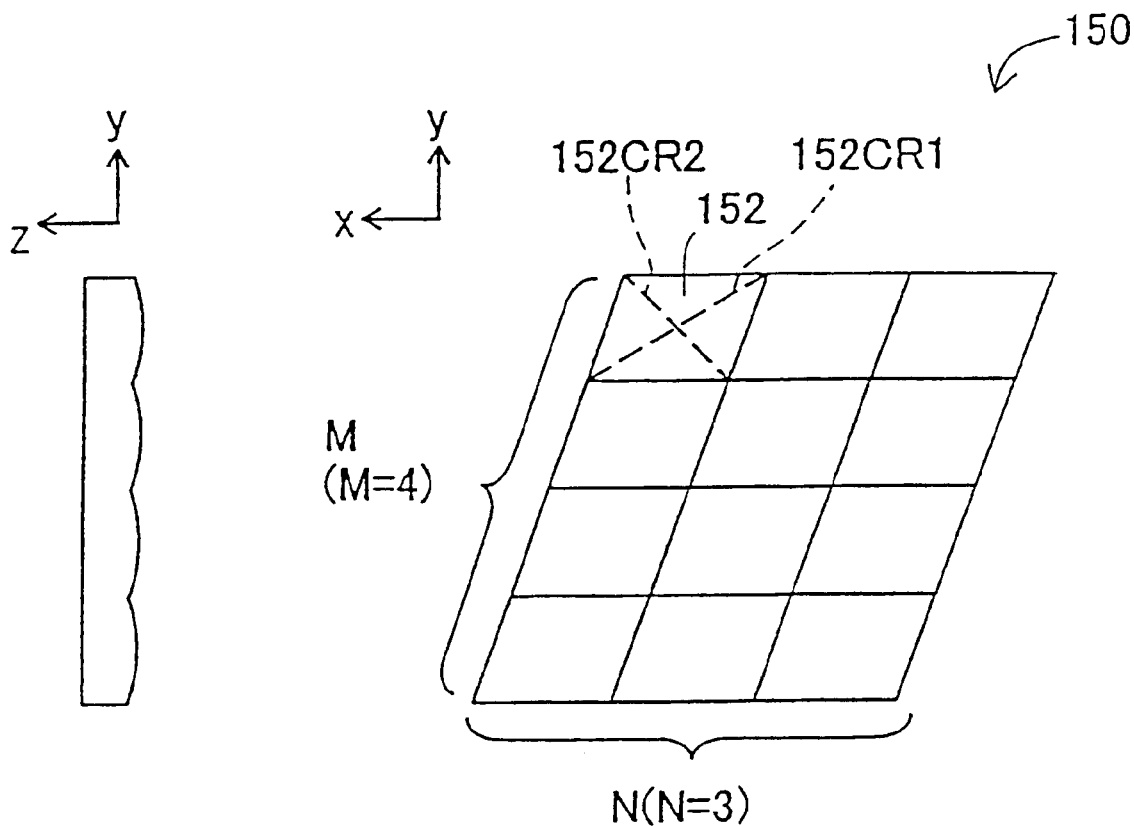
Fig. 6C  Fig. 6A

PROJECTOR

BACKGROUND OF THE INVENTION

1. Field of Invention

The present invention relates to a projector for projecting and displaying an image.

2. Description of Related Art

In a projector, image light representing an image is formed from illumination light using an electrooptic device, and an image is displayed by projecting the image light. As the electrooptic device, an optical modulation device (emitting direction control-type optical modulation device) for modulating the illumination light according to the image information (image signal) and emitting the image light representing the image, is used. As an example of the optical modulation device, a micro-mirror-type optical modulation device, such as a Digital Micro-mirror Device (registered trademark of Texas Instruments, Inc.; hereinafter, referred to as "DMD") can be given.

The DMD has a plurality of micro-mirrors corresponding to a plurality of pixels constituting the image. The inclination of the micro-mirrors varies with image information, and the micro-mirrors reflect light according to the inclination thereof. Of the light reflected by the micro-mirrors, the light reflected in a predetermined direction is used as the image light. That is, the DMD is an-electrooptic device of a type which controls the direction of reflection of light so as to form image light.

FIG. 13 is a schematic plan view showing a construction of a principal part of a conventional projector using a micro-mirror-type optical modulation device. A projector 5000 includes an illuminating optical system 100E, a micro-mirror-type optical modulation device 200, and a projection lens 300.

The illuminating optical system 100E includes a light source 110, a first condenser lens 120, a color wheel 130, a light-transmitting rod 180A, and a second condenser lens 190.

The light emitted from the light source 110 passes through the first condenser lens 120, the color wheel 130, the light-transmitting rod 180A, and the second condenser lens 190 to enter the micro-mirror-type optical modulation device 200. The light entered the micro-mirror-type optical modulation device 200 is modulated according to an image signal given to the micro-mirror-type optical modulation device 200. The light modulated by the micro-mirror-type optical modulation device 200 is projected as light representing an image (image light) via the projection lens 300, whereby an image is displayed.

There may be many cases where illuminance distribution of the light emitted from the light source 110 is not uniform. When such light is used as illumination light, there may be many cases where the brightness of the displayed image is not uniform according to the illuminance distribution of the illumination light. However, an image displayed by a projector may preferably have uniform brightness and be bright. Thus, in order to solve the problem, the light-transmitting rod 180A has been often used as in the illuminating optical system 100E. The light-transmitting rod 180A is an optical element having the function of emitting light whose illuminance distribution is uniform even if the illuminance distribution of incident light is not uniform.

The light-transmitting rod 180A is, however, an optical element in which light entered from an incident-side side surface 180AI of the light-transmitting rod 180A passes through the light-transmitting rod 180A while being repeatedly reflected by the inner surface of the light-transmitting rod 180A, thereby producing a uniform illuminance distribution of light emitted from a side surface 180AO on the side of an emitting surface. Therefore, in order to produce a uniform illuminance distribution of the light emitted from the light-transmitting rod 180A, the light entered the light-transmitting rod 180A must be reflected many times by the inner surface of the light-transmitting rod 180A. That is, the light-transmitting rod 180A requires a length according to the illuminance distribution of the light emitted from the light source 110, and the longer length is more preferable. Consequently, in a projector which utilizes an illuminating optical system using a light-transmitting rod, the length of an optical path of the illuminating optical system (physical length of the optical path between a light source and a micro-mirror-type optical modulation device) is generally elongated, causing a problem in that a reduction in size of the device is difficult.

Incidentally, the brightness of the image displayed by the projector greatly depends on the illuminance of an illumination region to which the light emitted from the illuminating optical system is applied. That is, in illuminating optical systems each emitting the same amount of illumination light, the illuminance increases in the illuminating optical system having a small area of the illumination region to which the illumination light is applied, whereby the image displayed by the projector is brightened. Therefore, the illuminating optical system of the projector may preferably have high illumination efficiency to a light application surface of the electrooptic device. However, when an optical modulation device (emitting direction control-type optical modulation device), such as the DMD, is used as an electrooptic device for the projector, there is a problem in that illumination efficiency of the illuminating optical system is decreased by the positional relationship between the illuminating optical system and the optical modulation device. In addition, this problem also occurs in optical modulation devices for controlling the direction of emission of illumination light applied to a light application surface (including a plurality of pixels) according to image information (for each pixel) to thereby emit image light representing an image.

SUMMARY OF THE INVENTION

It is one aspect of this invention to provide a technique for achieving a reduction in size of a projector using an optical modulation device (emitting direction control-type optical modulation device) for controlling a direction of emission of illumination light applied to a light application surface for each pixel according to image information to thereby emit image light representing an image, by shortening a length of an optical path (physical length of an optical path between a light source and the emitting direction control-type optical modulation device) of an illuminating optical system as compared to that of a conventional illuminating optical system. In addition, it is a second object of this invention to provide a technique for achieving an increase in illumination efficiency of the illuminating optical system.

In order to solve at least a part of the above-described problems, in accordance with the first aspect of the present invention, there is provided a projector, that may include an illuminating optical system for emitting illumination light, an optical modulation device for modulating the illumination light emitted from the illuminating optical system, and a projection optical system for projecting light emitted from the optical modulation device, wherein the optical modulation device is an emitting direction control-type optical modulation device for controlling a direction of emission of illumination light applied to a light application surface of the optical modulation device according to a given image signal to modulate the illumination light, thereby emitting image light representing an image.

The illuminating optical system may include a light source, a first lens array having a plurality of first small lenses for dividing light emitted from the light source into a plurality of partial light beam fluxes, and a second lens array having a plurality of second small lenses corresponding to the plurality of first small lenses.

The plurality of partial light beam fluxes divided by the first lens array are applied onto the entire light application surface of the optical modulation device via the second lens array, respectively. That is, the first lens array and the second lens array have the function of uniformly illuminating the light application surface of the optical modulation device, similarly to a light-transmitting rod used in a conventional illuminating optical system.

A length of an optical path of the illuminating optical system including the first lens array and the second lens array (physical length between the light source and the optical modulation device) can be easily adjusted according to setting of lens characteristics of the lens arrays. For this reason, the length of the optical path of the illuminating optical system can be easily shortened, as compared to the conventional illuminating optical system using the light-transmitting rod, whereby the size of a projector of the first aspect can be easily reduced, as compared to a conventional projector.

In the above-described projector of the first aspect, at least one of the plurality of first small lenses of the first lens array may be a decentering lens. In addition, at least a part of the plurality of second small lenses of the second lens array may be a decentering lens. If at least one of the plurality of first small lenses of the first lens array and at least one of the plurality of second small lenses of the second lens array is a decentering lens that is set according to a direction of light incident thereon, the partial light beam flux emitted therefrom can be efficiently applied to the light application surface of the optical modulation device.

In the above-described projector of the first aspect, the illuminating optical system may preferably include a first condenser lens, a color wheel having a plurality of color filters rotatably formed thereon, and a second condenser lens in order between the light source and the first lens array.

In addition, the illuminating optical system may include a first condenser lens, a color wheel having a plurality of color filters rotatably formed thereon, and a second condenser lens in order between the second lens array and the optical modulation device.

With these arrangements, it is possible to facilitate a reduction in the size of optical systems constituting a projector for displaying a color image.

In accordance with a second aspect of the present invention, there is provided a projector that may include an optical modulation device for controlling a direction of emission of illumination light applied to a substantially rectangular light application surface, including a plurality of pixels, for each pixel according to image information to thereby emit image light representing an image, an illuminating optical system for emitting the illumination light so that the central axis of the illumination light applied to the light application surface enters the light application surface at a predetermined angle, and a projection optical system for projecting image light emitted from the optical modulation device.

The illuminating optical system may include an optical element such that an outline shape of an emitting surface is a quadrilateral having first and second diagonal lines of different lengths, and when the illumination light emitted from the optical element obliquely enters the light application surface at the predetermined angle, the quadrilateral is set so that the ratio of two diagonal lines of a quadrilateral illumination region to which the illumination light is applied is closer to 1 than the ratio of the lengths of the first and second diagonal lines.

According to the above-described projector of the second aspect, the outline shape of the illumination region can be brought closer to the substantially rectangular light application surface even if the illumination light obliquely enters the light application surface at a predetermined angle. Therefore, the illumination efficiency of the illumination light applied to the light application surface of the optical modulation device can be increased.

In the above-described projector of the second aspect, the illuminating optical system may preferably include a light source, a first lens array having a plurality of first small lenses each being equivalent to the optical element, and dividing the light emitted from the light source into a plurality of partial light beam fluxes, and a second lens array having a plurality of second small lenses corresponding to the plurality of first small lenses.

With these arrangements, the illumination efficiency of each of the plurality of partial light beam fluxes applied to the light application surface can-be increased, and a uniform illuminance distribution of the illumination light applied to the light application surface can be produced.

Incidentally, each of the plurality of first lenses may be a lens having a parallelogram-shaped outline. With this arrangement, the plurality of first small lenses can be closely arranged without any spaces, so that the light emitted from the light source entering the first lens array can be used more effectively by being divided into a plurality of partial light beam fluxes.

Here, at least one of the plurality of first small lenses of the first lens array may be a decentering lens. In addition, at least one of the plurality of second small lenses of the second lens array may be a decentering lens. If at least one of the plurality of first small lenses of the first lens array and at least a part of the plurality of second small lenses of the second lens array is a decentering lens that is set according to a direction of light incident thereon, the partial light beam flux emitted therefrom can be efficiently applied to the light application surface of the optical modulation device.

In the above-described projector of the second aspect, the illuminating optical system may preferably include a first condenser lens, a color wheel having a plurality of color filters rotatably formed thereon, and a second condenser lens in order between the light source and the first lens array.

In addition, the illuminating optical system may include a first condenser lens, a color wheel having a plurality of color filters rotatably formed thereon, and a second condenser lens in order between the second lens array and the optical modulation device.

With these arrangements, it is possible to facilitate a reduction in the size of optical systems constituting a projector for displaying a color image.

Incidentally, in the above-described projector of the second aspect, the illuminating optical system may preferably include a light source, and a light-transmitting rod equivalent to the optical element.

With these arrangements, the illumination efficiency of the illumination light applied to the light application surface can also be increased, and a uniform illuminance distribution of the illumination light applied to the light application surface can be produced.

BRIEF DESCRIPTION OF THE DRAWINGS

FIGS. 6(A)–6(C) include a front view showing a first lens array 150 as viewed from the side of a light incident surface, a top view, and a side view thereof;

DETAILED DESCRIPTION OF PREFERRED EMBODIMENTS

Embodiments of the present invention will now be described with reference to the drawings. In the following embodiments, unless otherwise specified, three mutually perpendicularly intersecting directions are conveniently referred to as follows: the direction of travel of light is referred to as the z-axis direction (direction parallel to an optical axis), the direction of 12 o'clock as viewed from the z-axis direction is referred to as the y-axis direction (vertical direction), and the direction of 3 o'clock is referred to as the x-axis direction (horizontal direction).

Figure 1:
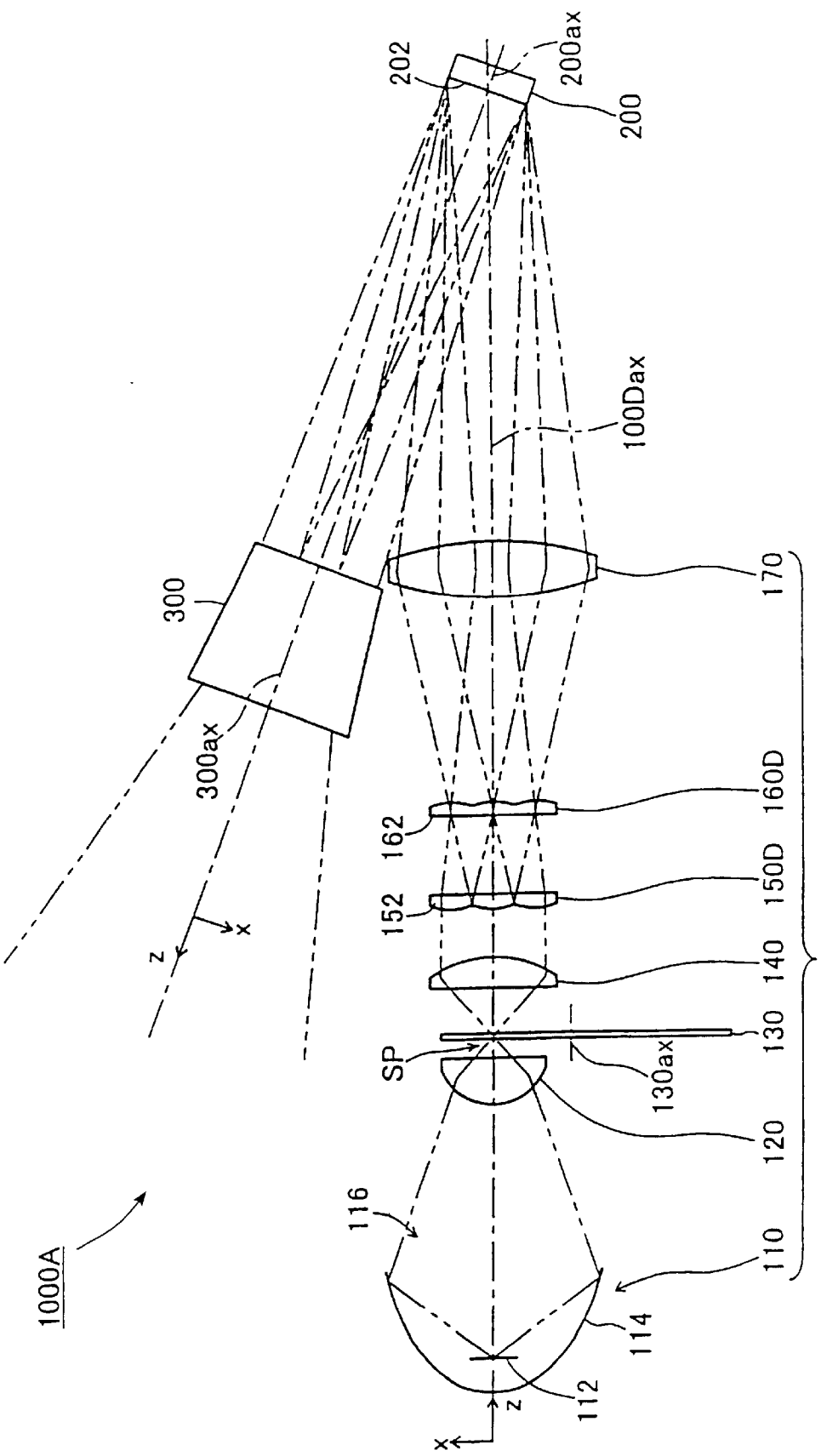
FIG. 1 is a schematic plan view showing a construction of a principal part of a projector according to a first embodiment of the present invention.

FIG. 1 is a schematic plan view showing a construction of a principal part of a projector according to a first embodiment of the present invention. A projector 1000A includes an illuminating optical system 100D, a micro-mirror-type optical modulation device 200, and a projection lens 300. The micro-mirror-type optical modulation device 200 and the projection lens 300 are disposed so that central axes 200ax and 300ax thereof coincide with each other.

The illuminating optical system 100D is disposed in such a manner that the central axis 100Dax of the illuminating optical system has a predetermined inclination relative to the central axis (normal line of a light application surface 202) 200ax of the micro-mirror-type optical modulation device 200 due to the restriction of an incident angle of light illuminating the micro-mirror-type optical modulation device 200. Here, the "light application surface" refers to a light application surface in a narrow sense which is a region which the applied light can be used as image light, that is, on which a micro-mirror described hereinbelow is formed. In the following description, however, the entire region to which light is applied including the outside of the region on which the micro-mirror is formed may be referred to as the light application surface. Incidentally, as regards "predetermined inclination", a description will be omitted because it causes no problem in the first embodiment, but it will be described in detail in a second embodiment.

The illuminating optical system 100D includes a light source 110, a first condenser lens 120, a color wheel 130, a second condenser lens 140, a first lens array 150D, a second lens array 160D, and a superimposing lens 170. These optical elements 110, 120, 130, 140, 150D, 160D, and 170 are disposed in order along the central axis 100Dax of the illuminating optical system 100D.

The light source 110 has a light source lamp 112 and a concave mirror 114. The light source lamp 112 is a radiation light source for emitting radiating light beams. A high-pressure discharge lamp, such as a metal halide lamp or a high-pressure mercury lamp, is used as the light source lamp 112. The concave mirror 114 is an ellipsoidal concave mirror for emitting radiating light beams from the light source lamp 112 as condensed light from an opening 116 so that the radiating light beams are reflected to enter the first condenser lens 120. As the concave mirror 114, a parabolic concave mirror for reflecting the radiating light beams from the light source lamp 112 and emitting them as substantially parallel light, may be used. In this case, another condenser lens may be added between the light source 110 and the condenser lens 120, so that the substantially parallel light enters the first condenser lens 120.

The first condenser lens 120 is an optical element for condensing light from the light source 110 in the vicinity of the color wheel 130 so as to reduce the size of a light spot applied to the color wheel 130.

Figure 2:
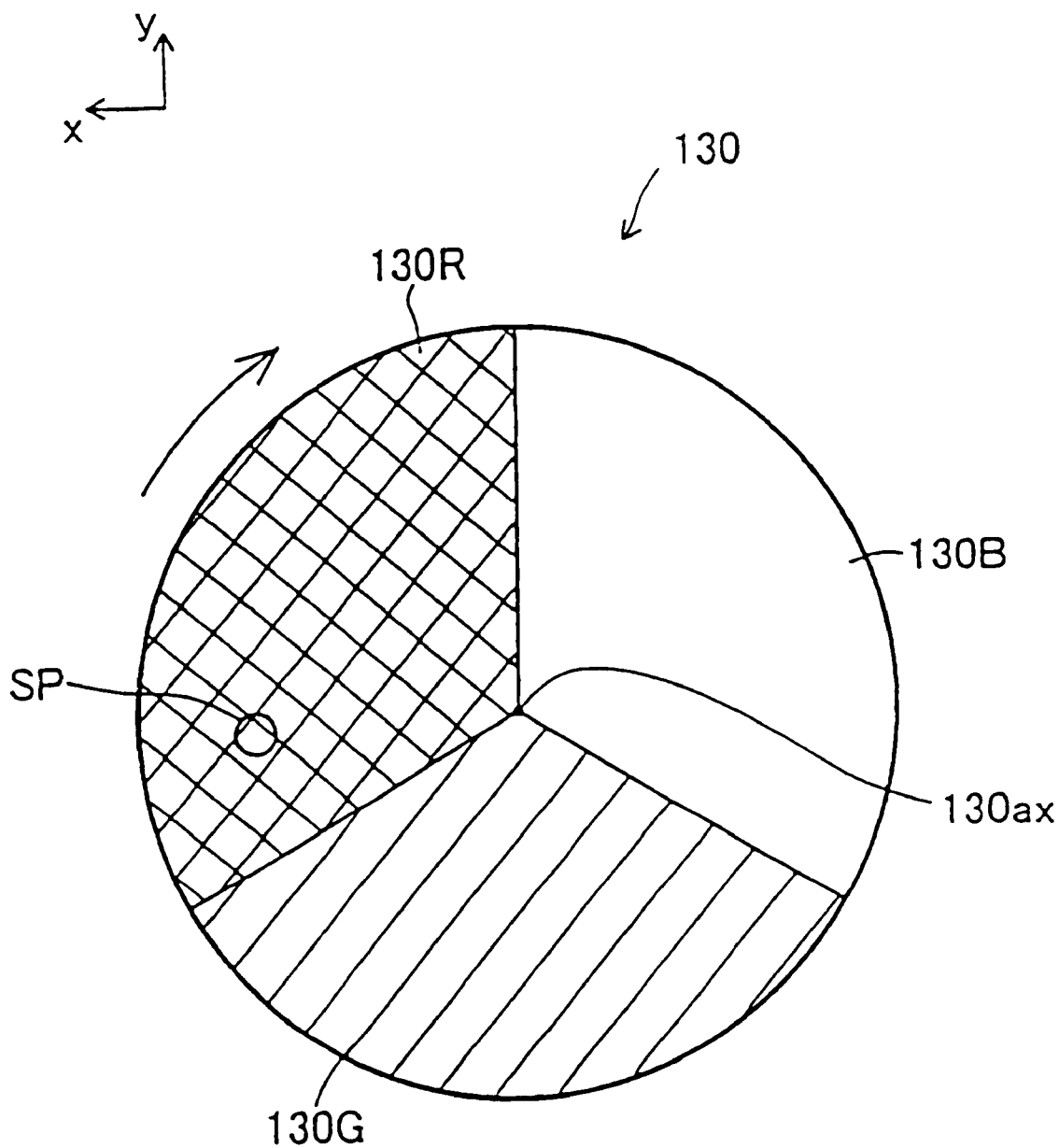
FIG. 2 is a front view of a color wheel 130 as viewed from the side of a light source 110.

FIG. 2 is a front view of the color wheel 130 as viewed from the side of the light source 110. The color wheel 130 has three transmissive color filters 130R, 130G, and 130B formed on three fan-shaped regions that are divided in a direction of rotation thereof. A first color filter 130R has the function of transmitting light in a red wavelength region (hereinafter, referred to as "red light R") and of reflecting or absorbing light in other wavelength regions. Similarly, second and third color filters 130G and 130B have the function of transmitting light in a green wavelength region and light in a blue wavelength region (hereinafter, referred to as "green light G" and "blue light B", respectively) and of reflecting or absorbing light in other wavelength regions, respectively. The color filter is formed of, for example, a dielectric multilayer film or a filter sheet formed by using a dye.

The color wheel 130 is disposed so that a light spot SP condensed by the first condenser lens 120 is applied to a predetermined peripheral position deviating from a central axis 130ax of the color wheel 130. The color wheel 130 is rotated by a motor (not shown) about the rotation axis 130ax at a constant speed. In this case, the light spot SP cyclically illuminates the regions of the color filters 130R, 130G, and 130B at constant intervals in accordance with the rotation of the color wheel 130. Consequently, the light transmitted by the color wheel 130 is cyclically changed to the red light R, the green light G, and the blue light B in accordance with the rotation of the color wheel 130.

The second condenser lens 140 shown in FIG. 1 has the function of condensing light transmitted by the color wheel 130 so that the light enters the first lens array 150D. In this embodiment, the second condenser lens 140 is set so that divergent light transmitted by the color wheel 130 becomes substantially parallel light.

The first lens array 150D is a lens array composed of a plurality of first small lenses 152D. The first lens array 150D has the function of dividing the substantially parallel light emitted from the second condenser lens 140 into a plurality of partial light beam fluxes corresponding to the plurality of first small lenses 152, and of condensing the partial light beam fluxes in the vicinity of the second lens array 160D.

Figure 3B:
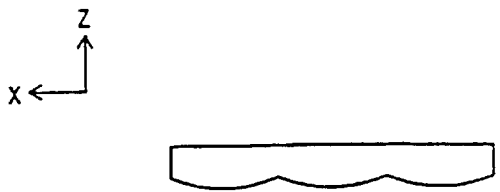
FIGS. 3(A)–3(C) include a front view showing a first lens array 150D as viewed from the side of a light incident surface, a top view, and a side view thereof.
Figures 3A, 3C:
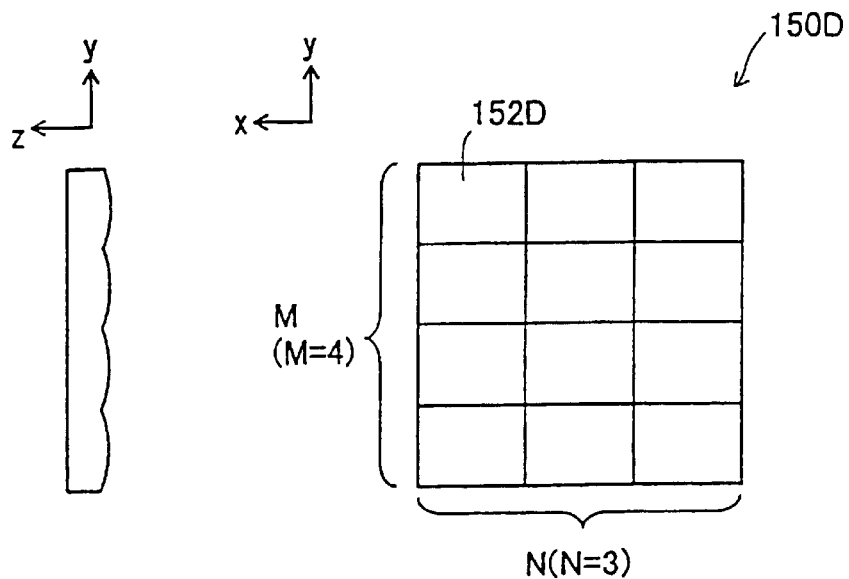

FIGS. 3(A)–3(C) include a front view showing the first lens array 150D as viewed from the side of the light incident surface, a top view, and a side view thereof. As shown in FIG. 3(A), the first lens array 150D has a construction such that the first small lenses 152D, which are substantially rectangular concentric lenses, are arranged in the form of a matrix with M rows and N columns. FIGS. 3(A)–3(C) show an example in which M=4, and N=3. The "concentric lens" refers to a lens in which a geometric center and an optical center of the lens coincide with each other.

The second lens array 160D includes second small lenses 162D corresponding to the first small lenses 152D of the first lens array 150D. The second lens array 160D has the function of forming an image of the first lens array 150D on an application surface of the micro-mirror-type optical modulation device 200 via the superimposing lens 170. The second small lenses 162D of the second lens array 160D may have any shape as long as the corresponding partial light beam fluxes emitted from the first lens array 150D can enter. In this embodiment, a lens array, which is different from the first lens array 150D only in a direction of lens surface (convex surface), is used.

The superimposing lens 170 has the function of superimposing a plurality of partial light beam fluxes emitted from the second lens array 160 on an application surface of the micro-mirror-type optical modulation device 200.

A plurality of partial light beam fluxes emitted from the first lens array 150D pass through the second lens array 160D and the superimposing lens 170 to illuminate a light application surface 202 of the micro-mirror-type optical modulation device 200, whereby the light application surface 202 is uniformly illuminated even if light emitted from the light source 110 has illuminance distribution.

The micro-mirror-type optical modulation device 200 is an optical modulation device for emitting image light representing an image toward the projection lens 300 by reflecting the illumination light applied to the light application surface by micro-mirrors corresponding to pixels according to an image signal (image information). The image light emitted from the micro-mirror-type optical modulation device 200 is projected via the projection lens 300, whereby an image is displayed.

Figure 13:
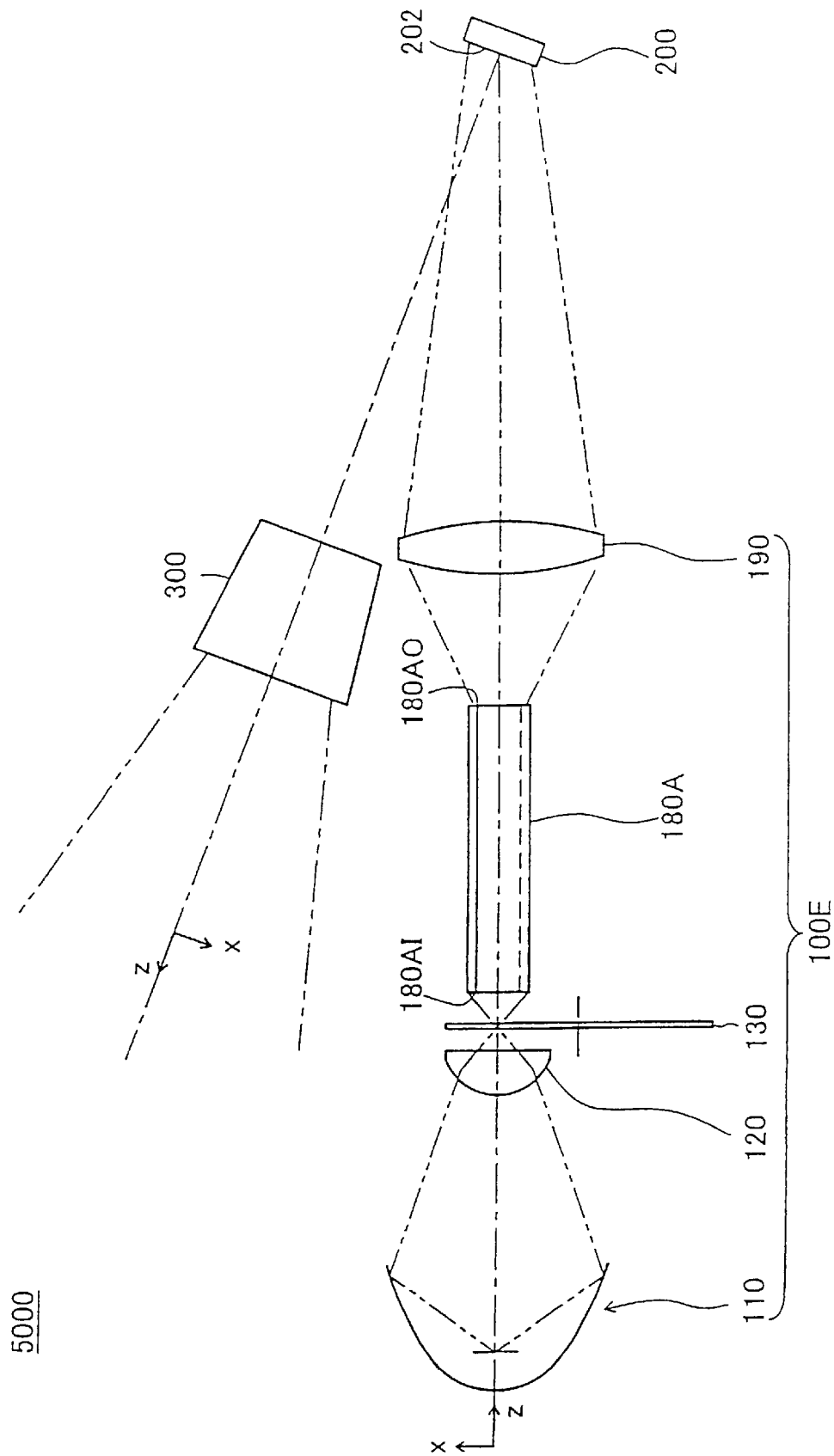
FIG. 13 is a schematic plan view showing a construction of a principal part of a conventional projector using a micro-mirror-type optical modulation device.

As described above, the illuminating optical system 100D of the projector 1000A in this embodiment realizes the function similar to that of the light-transmitting rod 180A of the conventional illuminating optical system 100E (FIG. 13) by an integrator optical system composed of the first lens array 150D, the second lens array 160D, and the superimposing lens 170.

The physical length between the first lens array 150D and the micro-mirror-type optical modulation device 200 can be determined by the relationship of focal lengths among the optical elements of the first lens array 150D, the second lens array 160D, and the superimposing lens 170, and does not depend on the illuminance distribution of the light emitted from the light source 110. In addition, the focal length of each of the optical elements can be freely set in some degree. Therefore, as compared to a case where the illuminating optical system having the length of the optical path depending on the illuminance distribution is used, as described in a conventional example, the length of the optical path of the illuminating optical system can be shortened, whereby a reduction in size of the projector can be achieved, as compared to the conventional projector.

In this embodiment, although a plurality of first small lenses 152D of the first lens array 150D are substantially rectangular lenses, they are not limited thereto, and they may be lenses each having a pentagonal or a hexagonal outline shape. That is, they may be formed in any shape as long as they can divide the light emitted from the light source 110 into a plurality of partial light beam fluxes.

In addition, although the second small lenses 162D of the second lens array 160D are composed of concentric lenses similarly to the first small lenses 152D of the first lens array 150D, they are not limited thereto. For example, a modification shown below can be made.

Figure 4:
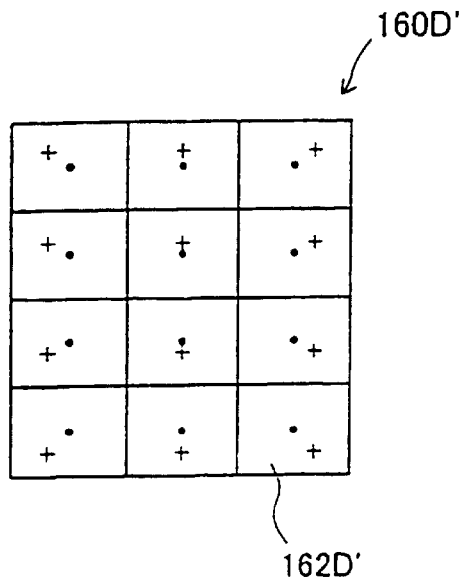
FIG. 4 is a front view showing a modification of a second lens array 160D.

FIG. 4 is a front view showing a modification of the second lens array 160D. In a second lens array 160D' shown in FIG. 4, each of the second small lenses 162D' is composed of a decentering lens. The "decentering lens" refers to a lens in which an optical center (shown by +) of the lens are shifted from a position of a geometric center (shown by ·).

A plurality of partial light beam fluxes divided by the first lens array 150D may not efficiently be superimposed on the light application surface 202 of the micro-mirror-type optical modulation device 200 due to spherical aberration of the superimposing lens 170 shown in FIG. 1, whereby illumination efficiency may be decreased. In such a case, the influence of spherical aberration of the superimposing lens 170 can be suppressed by using the second lens array 160D' shown in FIG. 4, so that the plurality of partial light beam fluxes can be sufficiently superimposed on the light application surface 202 of the micro-mirror-type optical modulation device 200, and a decrease in illumination efficiency can be suppressed.

In addition, the illumination efficiency of the micro-mirror-type optical modulation device 200 to the light application surface 202 may be decreased when parallelism of the light entering the first lens array 150D is bad. In such a case, a decrease in illumination efficiency can be suppressed by the first small lenses 152D of the first lens array 150D by being composed of decentering lenses.

Furthermore, the first lens array 150D and the second lens array 160D may be composed of decentering lenses.

Although the central axis 300ax of the projection lens 300 is disposed so as to coincide with the central axis 200ax of the micro-mirror-type optical modulation device 200 in the projector 1000A of the above-described embodiment, the disposition of the central axis 300ax is not limited thereto. The central axis 300ax of the projection lens 300 may be disposed by being shifted from the central axis 200ax of the micro-mirror-type optical modulation device 200. This can realize shifting projection.

In the projector 1000A of the above-described embodiment, although an example of the color wheel 130 has been shown in which the three transmissive color filters 130R, 130G, and 130B are formed on the region divided into three equal parts along the direction of rotation thereof, the color wheel is not limited thereto. For example, the region may not be divided into three equal parts, but the area of the region to be divided may be varied in accordance with the color valance. In addition, the region may be divided into six equal parts of red, green, blue, red, green, and blue. Alternatively, the region may be divided into four equal parts, and one of them may be colorless and transparent. In this case, if the rotation of the color wheel is stopped so that the light from the light source 110 passes through only the colorless and transparent region, a monochrome image can be displayed. In addition, instead of color filters of red, green, and blue, color filters capable of displaying a color image, for example, color filters of cyan, magenta, and yellow may be used. In the present invention, "color filters" include not only those having the function of transmitting light in a specific wavelength region and of reflecting or absorbing light in other wavelength regions, but also those having the function of transmitting light in each of wavelength regions (function of a transparent region).

In addition, although the projector 1000A of the above-described embodiment is a device including the color wheel 130 and displaying a color image, the color wheel 130 may be omitted so as to display a monochrome image. In this case, the first condenser lens 120 and the second condenser lens 140 may also be omitted. In addition, the concave mirror 114 of the light source 110 may be a parabolic concave mirror so as to allow substantially parallel light to enter the first lens array 150D.

The directions of the lens surfaces (convex surfaces and concave surfaces) of the optical elements 120, 140, 150D, 160D, and 170 are not limited to the directions shown in FIG. 1. They can also face in the reverse direction, and the directions of the lens surfaces of the optical elements may be arbitrary combined. In addition, each of the optical elements 120, 140, 150D, 160D, 170, and 300 may be formed by a compound lens having a plurality of combined lenses. Also, optical elements adjacent to each other can be bonded and combined. For example, the second condenser lens 140 and the first lens array 150D can be bonded and combined. In addition, the second lens array 160D and the superimposing lens 170 can be bonded and combined. Furthermore, it is possible to replace a plurality of optical elements with a single optical element. For example, the function of the superimposing lens 170 can be imparted to the second lens array 160D to thereby omit the superimposing lens 170. It is also possible to omit any one of the optical elements. For example, the first condenser lens 120 or the second condenser lens 140 can be omitted.

In addition, a prism utilizing the internal reflection may be provided between the micro-mirror-type optical modulation device 200 and the projection lens 300 to allow the illumination light emitted from the illuminating optical system 100C so as to be totally reflected by the light application surface 202 of the micro-mirror-type optical modulation device 200, and the image light emitted from the micro-mirror-type optical modulation device 200 may be transmitted so as to be emitted toward the projection lens 300.

Incidentally, the above-described modifications can also be applied to the following embodiments.

Figure 5:
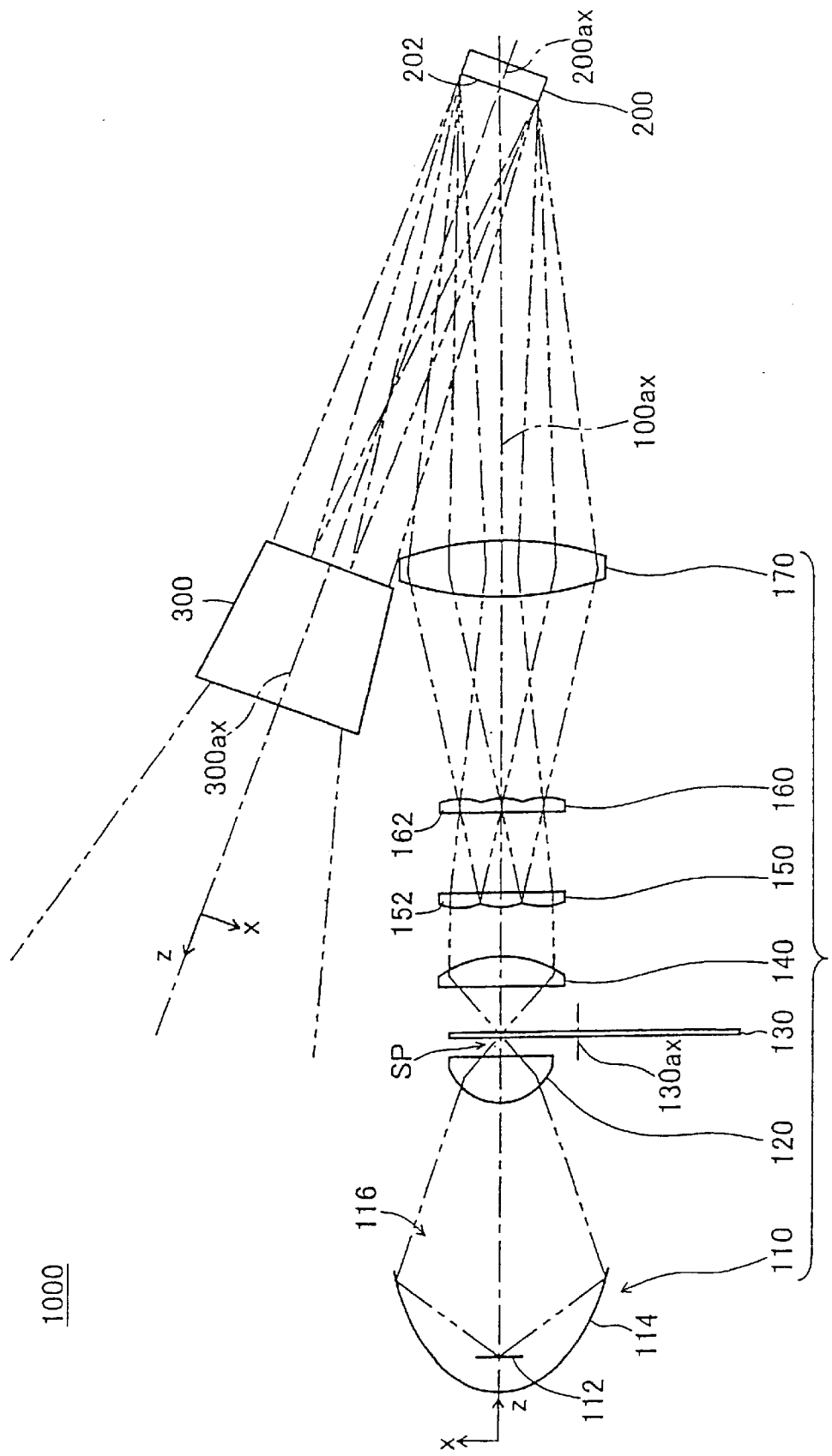
FIG. 5 is a schematic plan view showing a construction of a principal part of a projector according to a second embodiment of the present invention.

FIG. 5 is a schematic plan view showing a structure of a principal part of a projector according to a second embodiment of the present invention. A projector 1000 includes an illuminating optical system 100, a micro-mirror-type optical modulation device 200, and a projection lens 300. The difference between the projector 1000 and the projector 1000A of the first embodiment is that the illuminating optical system 100D is replaced by the illuminating optical system 100, and other respects are similar to those of the first embodiment. Constructions similar to those of the first embodiment are indicated by the same reference numerals, and a detailed description thereof will be omitted.

The illuminating optical system 100 is, as described also in the first embodiment, disposed in such a manner that the central axis 100$ax$ of the illuminating optical system has a predetermined inclination relative to the central axis (normal line of a light application surface 202) 200$ax$ of the micro-mirror-type optical modulation device 200 due to the restriction of an incident angle of light illuminating the micro-mirror-type optical modulation device 200.

A first lens array 150 is a lens array composed of a plurality of small lenses 152. Similarly to the first lens array 150D (FIG. 1), the first lens array 150 has the function of dividing substantially parallel light emitted from second condenser lens 140 into a plurality of partial light beam fluxes corresponding to the first small lenses 152, and of condensing the partial light beam fluxes in the vicinity of a second lens array 160.

FIGS. 6(A)–6(C) include a front view showing the first lens array 150 as viewed from the side of the light incident surface, a top view, and a side view thereof. As shown in FIG. 6(A), the first lens array 150 has a construction such that the first small lenses 152 are arranged in the form of a matrix with M rows and N columns. FIGS. 6(A)–6(C) show an example in which M=4, and N=3. The outline of each of the small lenses 152 is a parallelogram such that a length of a diagonal line 152CR1 obtained by connecting lower left and upper right vertexes is longer than a length of a diagonal line 152CR2 obtained by connecting upper left and lower right vertexes. The small lenses 152 are closely disposed with sides thereof being in contact with each other. Therefore, the outline of the first lens array 150 as the entire lens is also a parallelogram formed by sides parallel to the sides of the small lens 152. The shape of the first lens array 150 will be further described hereinbelow.

The second lens array 160 includes small lenses 162 corresponding to the small lenses 152 of the first lens array 150. Similarly to the second lens array 160D (FIG. 1), the second lens array 160 has the function of forming an image of the first lens array 150 on an application surface of the micro-mirror-type optical modulation device 200 via the superimposing lens 170. Incidentally, each of the small lenses 162 of the second lens array 160 may have any shape other than the parallelogram as long as the corresponding partial light beam fluxes emitted from the first lens array 150 can enter. In this embodiment, a lens array, which is different from the first lens array 150 only in a direction of lens surface (convex surface), is used.

Figure 7A:
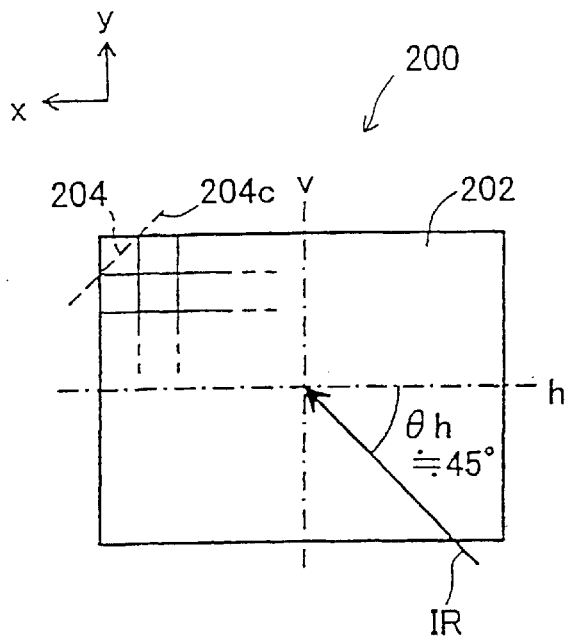
FIGS. 7(A)–7(C) include explanatory views each showing a DMD that is an example of a micro-mirror-type optical modulation device 200.
Figure 7B:
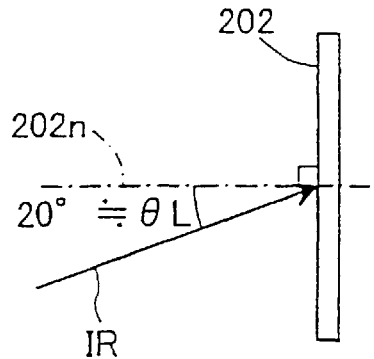
Figure 7C:
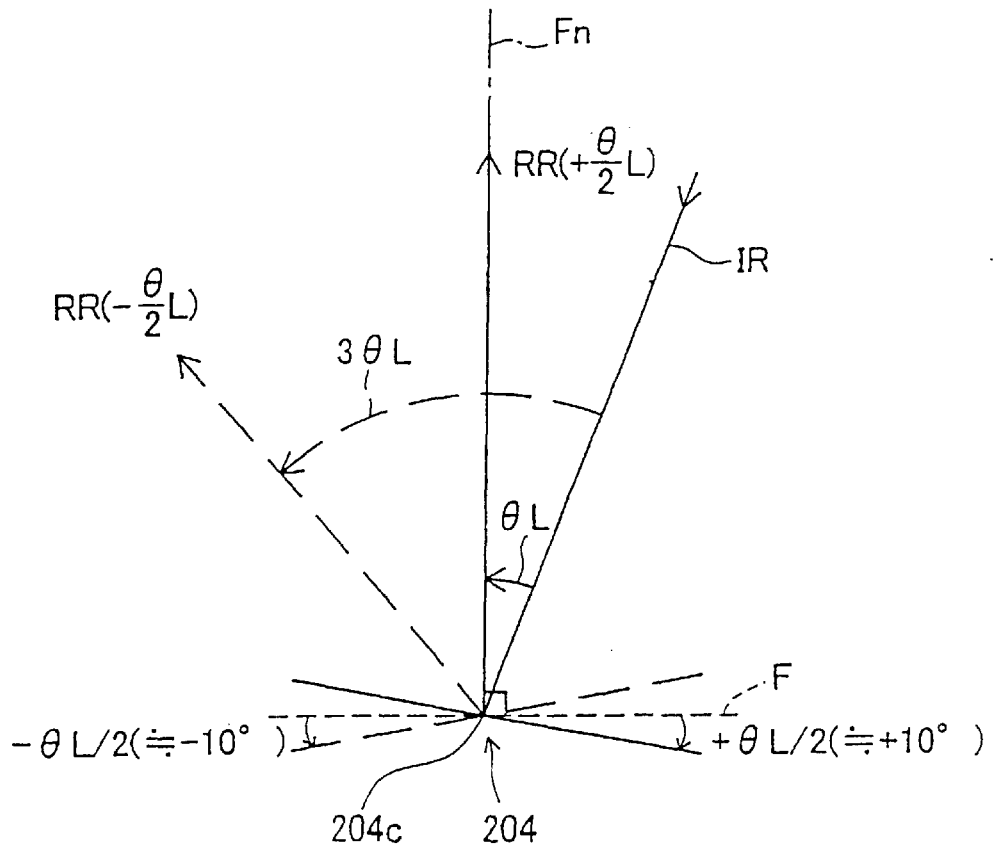

The micro-mirror-type optical modulation device 200 is an optical modulation device for emitting image light representing an image toward the projection lens 300 by reflecting the illumination light applied to the light application surface by a micro-mirror corresponding to each of pixels according to image information (image signal). FIGS. 7(A)–7(C) includes explanatory views each showing a DMD that is an example of the micro-mirror-type optical modulation device 200. As shown in FIG. 7(A), a plurality of micro-mirrors 204, each having a substantially square outline, are formed on the light application surface 202 of the DMD 200 in the form of a matrix. Each of the micro-mirrors 204 is formed to be rotatable about a rotation axis 204c, which is a diagonal line obtained by connecting lower left and upper right vertexes thereof, within a predetermined angular range. These micro-mirrors 204 correspond to pixels constituting the image.

Here, to simplify the description, the illumination light applied to the light application surface 202 is indicated by a central ray (incident ray) IR representing the illumination light. In addition, a horizontal axis passing through an incident position of the illumination light IR to the light application surface 202 and is parallel to the x-axis is referred to as h, and the vertical axis parallel to the y-axis is referred to as v. In order to simplify the construction of the device, the illumination light IR applied to the DMD 200 may preferably have an incident surface perpendicular to the rotation axes 204c of the micro-mirrors 204. For this reason, the illumination light IR applied to the DMD 200, as shown in FIG. 7(A), is allowed to enter in a direction diagonally from the lower right so that an inclination θh of the optical path of the illumination light IR projected on the x-y plane parallel to the light application surface 202 relative to the horizontal axis h is about 45 degrees. In addition, as shown in FIG. 7(B), the illumination light IR is allowed to enter so that an incident angle θL to the light application surface 202 is about 20 degrees in a plane that is perpendicular to the light application surface 202 and including the optical path of the illumination light IR.

FIG. 7(C) shows an incident surface including the light incident on the micro-mirror 204 and the light reflected therefrom, that is, an optical path in a cross section perpendicular to the rotation axis 204c. The micro-mirror 204 is rotated about ±(θL/2) degrees (á±10 degrees) about the rotation axis 204c relative to a plane F (shown by a broken line in FIG. 7(C)) parallel to the light application surface 202. Angles along a clockwise direction are referred to as positive angles. As described above, the illumination light IR enters the micro-mirror 204 from a direction inclined +θL (á+20 degrees) relative to the normal line Fn of the plane F.

When the micro-mirror 204 is inclined by +(θL/2) relative to the plane F, the illumination light IR is emitted as reflected light RR (+θL/2) in a direction inclined by −θL relative to the illumination light IR, that is, in a direction parallel to the normal line Fn. When the micro-mirror 204 is inclined by −(θL/2), the illumination light IR is emitted as reflected light RR (−θL/2) in a direction inclined by −(3·θL). In this way, the illumination light IR applied to the micro-mirror 204 is reflected and emitted in different directions according to the rotation angle of the micro-mirror 204. For example, when the projection lens is disposed in the direction of the reflected light RR (+θL/2), only the reflected light RR (+ζL/2) is used as image light. In this way, in a state where the micro-mirror 204 is inclined by +(θL/2), the reflected light is projected via the projection lens to realize a bright display, and in a state where the micro-mirror lens 204 is inclined by −(θL/2), the reflected light is not projected via the projection lens to realize a dark display. An intermediate gradation is realized by a method for controlling the ratio of bright and dark displays according to the gradation in a fixed time in which one pixel draws an image (a so-called pulse width modulation method).

In the projector 1000 of this embodiment, the projection lens 300 is disposed in such a manner that the reflected light in a state where the micro-mirror 204 is inclined by +(θL/2) is used as the image light. This allows the image light emitted from the micro-mirror-type optical modulation device 200 according to image information to be projected via the projection lens 300, and an image is thereby displayed.

In addition, the red light R, the green light G, and the blue light B are cyclically emitted at constant intervals from the illuminating optical system 100 according to the rotation of the color wheel 130. In this case, by controlling the micro-mirrors 204 of the micro-mirror-type optical modulation device 200 according to the image information corresponding to the applied color light, a color image can be displayed.

The projector 1000 of the present invention is, as described above, characterized by the shape of the first lens array 150. That is, as shown in FIGS. 6(A)6–(C), the device is characterized in that the outline of the first lens array 150 and a plurality of small lenses 152 constituting the first lens array 150 is a parallelogram. The first lens array 150 is formed in the above shape for the following reasons.

Figure 8A:
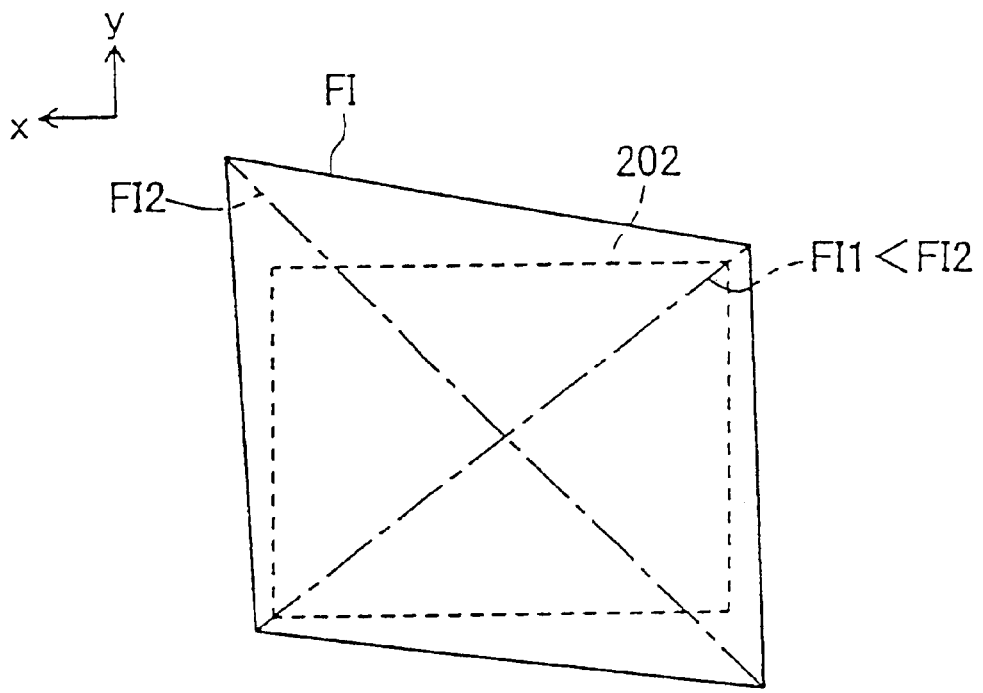
FIGS. 8(A) and 8(B) include explanatory views each showing illumination light applied onto a light application surface 202.
Figure 8B:
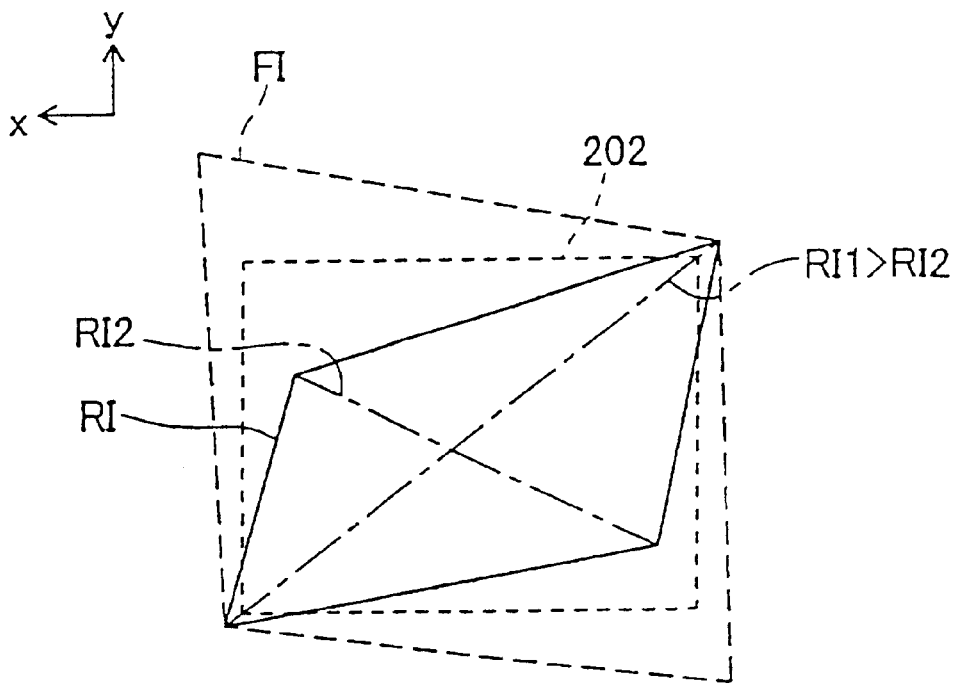

As described above, the illumination light of the illuminating optical system 100 is applied to the micro-mirror-type optical modulation device 200 not from the direction of the normal line of the light application surface 202 but from the direction having a fixed inclination relative to the normal line (FIGS. 7(A)–7(C)). FIGS. 8(A) and 8(B) include explanatory views each showing the illumination light applied onto the light application surface 202. If the small lenses 152 of the first lens array 150 are composed of substantially rectangular lenses, the illumination region FI of the illumination light applied so as to include the light application surface 202 is not of a substantially rectangular shape, but of an irregular shape according to the incident angle thereof.

As described with reference to FIGS. 7(A)–7(C), the illumination region FI when the illumination light is applied in a direction diagonally from the lower right is of a quadrilateral such that the length of a diagonal line FI2 obtained by connecting upper left and lower right vertexes is longer than the length of a diagonal line FI1 obtained by connecting upper right and lower left vertexes, as shown in FIG. 8(A). When the illumination region FI is not of a substantially rectangular shape but is irregular, the ratio of ineffective light that is not applied to the light application surface 202 is increased. For this reason, the illumination efficiency of the illumination light emitted from the illuminating optical system 100 is decreased. In order to decrease such ineffective light, the shape of the illumination light emitted from the illuminating optical system 100 may be distorted in advance so that the illumination region FI has a substantially rectangular shape.

That is, as shown in FIG. 8(B), of two diagonal lines RI1 and RI2 of a cross section RI perpendicular to the central axis of the illumination light emitted from the illuminating optical system 100, the longer diagonal line RI1 may be set so as to correspond to a longer diagonal line FI2 of the distorted illumination region FI, and the shorter diagonal line RI2 may be set so as to correspond to a shorter diagonal line FI1 of the distorted illumination region FI. In other words, the illuminating optical system may include an optical element in which an outline shape of an emitting surface is a quadrilateral having first and second diagonal lines of different lengths, and when the illumination light emitted from the optical element obliquely enters a light application surface at a predetermined angle, the quadrilateral may be set so that the ratio of two diagonal lines of a quadrilateral illumination region to which the illumination light is applied comes closer to 1 than the ratio of the lengths of the first and second diagonal lines. This can increase the illumination efficiency of the illuminating optical system.

In the projector 1000 of the present invention, each of the small lenses 152 constituting the first lens array 150 of the illuminating optical system 100 has an outline shape of a parallelogram, as shown in FIGS. 6(A)–6(C). The outline of the parallelogram has, similarly to the cross section RI of the illumination light, a shape such that the length of a lens diagonal line 152CR1 of the small lens 152 corresponding to a cross sectional diagonal line RI1 is shorter than a lens diagonal line 152CR2 corresponding to a cross sectional diagonal line RI2. This can decrease ineffective light that is not applied to the light application surface 202. This can increase the illumination efficiency of the partial light beam fluxes emitted from the small lenses 152. In addition, since the small lens 152 has an outline shape of a parallelogram, the small lenses 152 can be closely arranged. This allows the light emitted from the light source 110 to be effectively used, thus providing excellent utilizing efficiency of the light emitted from the light source 110. In this case, in order to allow the illumination light emitted from the illuminating optical system 100 to be used more effectively, the lens arrays 150 and 160 may be actually preferably rotated about the central optical axes thereof to adjust the shape of the illumination region.

In addition, in order to further increase light utilizing efficiency of the partial light beam fluxes emitted from the first lens array 150, the shape of each of the small lenses 152 of the first lens array 150 as viewed from the side of a light incident surface may preferably be similar to the shape of the cross section RI shown in FIG. 8(B). This allows the illumination region of the partial light beam fluxes emitted from the small lenses 152 to be brought closer to the outline of the substantially rectangular light application surface 202, so that the illumination efficiency of the partial light beam fluxes can be further increased. In this case, however, the small lenses 152 may not be closely arranged, so that the utilizing efficiency of the light emitted from the light source 110 may be decreased.

As described above, since the projector 1000 of the present invention can decrease ineffective light in the illumination light illuminating the light application surface 202 of the micro-mirror-type optical modulation device 200, the illumination efficiency of the illumination light emitted from the illuminating optical system 100 can be increased. In addition, similarly to the first embodiment, the illuminating optical system 100 includes an integrator optical system composed of the first lens array 150, the second lens array 160, and the superimposing lens 170. Therefore, since the light application surface 202 of the micro-mirror-type optical modulation device 200 is uniformly illuminated by the illuminating optical system 100, an image having uniform brightness can be displayed. In addition, the length of the optical path of the illuminating optical system can be shortened as compared to that of the conventional illuminating optical system. This can achieve a reduction in size of the projector as compared to the conventional projector.

In this embodiment, although the DMD shown in FIGS. 3(A)–3(C), has been described as an example of the micro-mirror-type optical modulation device 200, the micro-mirror-type optical modulation device 200 is not limited thereto. For example, various modes of the incident angle of the illumination light may be considered according to the direction of the rotation axes and the rotation range of the micro-mirrors 204. According to this, various modes of the shape of the small lens 152 of the first lens array 150 may be considered. For example, when the inclination θL of the illumination light relative to the normal line of the light application surface 202 is larger than the value shown in FIGS. 6(A)–6(C), the small lens 152 can be formed in a shape of a parallelogram having a larger ratio of two lens diagonal lines. In addition, in this embodiment, although a case has been described where the DMD is applied as the micro-mirror-type optical modulation device, the micro-mirror-type optical modulation device is not limited thereto, and various emitting direction control-type optical modulation devices for reflecting illumination light applied to the light application surface according to image information to thereby emit image light representing an image, can be used.

In addition, a prism utilizing the internal reflection may be provided between the micro-mirror-type optical modulation device 200 and the projection lens 300 to allow the illumination light emitted from the illuminating optical system 100 to be totally reflected by the light application surface 202 of the micro-mirror-type optical modulation device 200, and the image light emitted from the micro-mirror-type optical modulation device 200 may be transmitted to be emitted toward the projection lens 300.

Incidentally, the above-described modifications can also be applied to the following embodiments.

Figure 9:
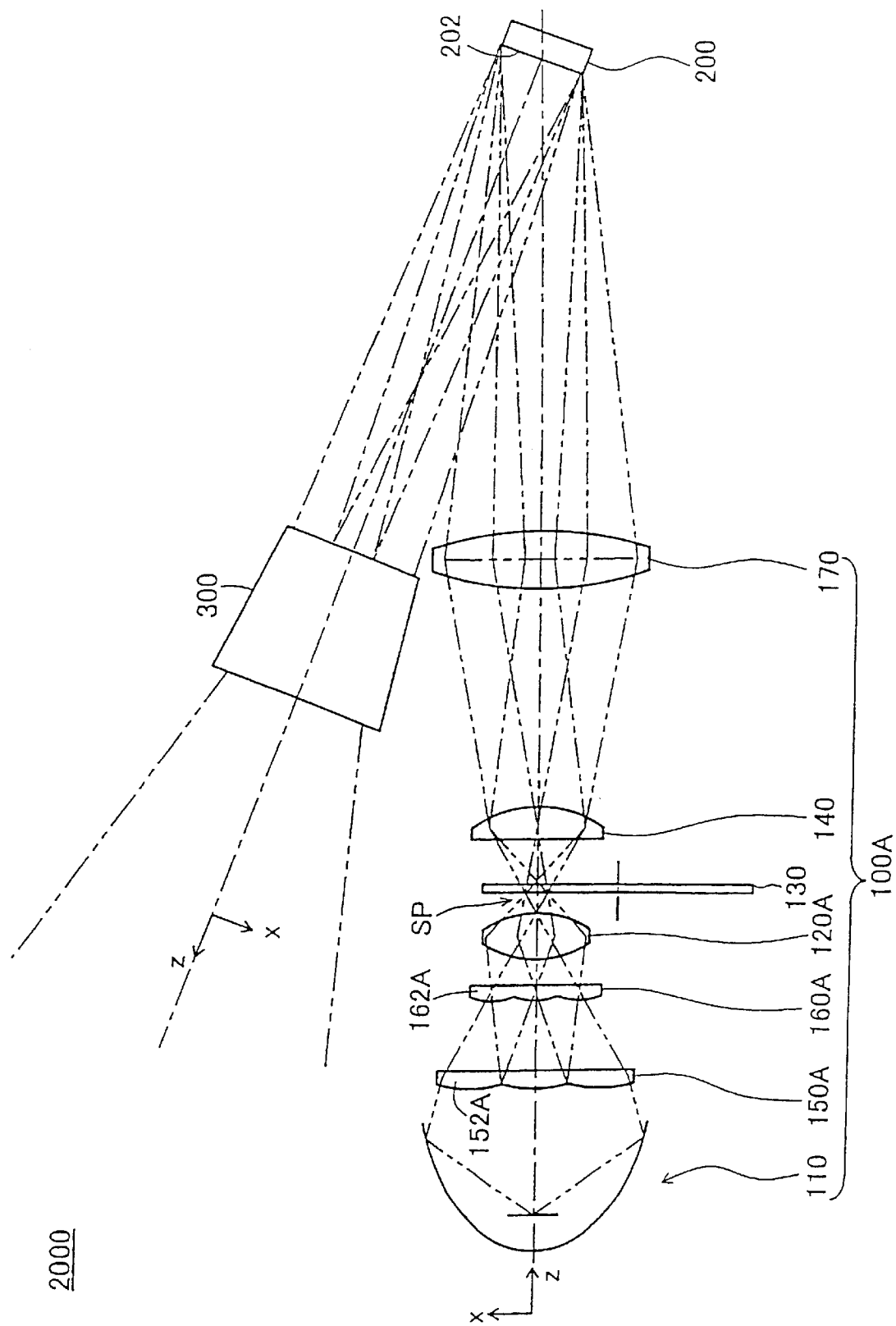
FIG. 9 is a schematic plan view showing a construction of a principal part of a projector according to a third embodiment of the present invention.

FIG. 9 is a schematic plan view showing a structure of a principal part of a projector according to a third embodiment of the present invention. A projector 2000 includes an illuminating optical system 100A, a micro-mirror-type optical modulation device 200, and a projection lens 300. The difference between the projector 2000 and the projector 1000 (FIG. 5) of the second embodiment is that the illuminating optical system 100 is replaced by the illuminating optical system 100A, and other respects are similar to those of the second embodiment. Constructions similar to those of the second embodiment are indicated by the same reference numerals, and a detailed description thereof will be omitted.

The difference between the illuminating optical system 100A of this embodiment and the illuminating optical system 100 of the second embodiment is that a first lens array 150A and a second lens array 160A are provided between a light source 110 and a first condenser lens 120A. The first lens array 150A has, similarly to the first lens array 150 (FIGS. 6(A)–6(C)) small lenses 152A each having an outline shape of a parallelogram. The first lens array 150A divides condensed light emitted from the light source 110 into a plurality of partial light beam fluxes. The small lenses 162A constituting the second lens array 160A, may have such a construction as to include the partial light beam fluxes emitted from the first lens array 150A, as described above. Therefore, the shape of the second lens array 160A may be smaller than the first lens array 150A. The functions of the optical elements are the same except the first condenser lens 120A.

The light emitted from the light source 110 is divided into a plurality of partial light beam fluxes by the first lens array 150A to enter the first condenser lens 120A via the second lens array 160A. The first condenser lens 120A has the function of superposing the entered partial light beam fluxes on a color wheel 130 to form an optical spot SP. The partial light beam fluxes emitted from the color wheel 130 enter a superimposing lens 170 via a second condenser lens 140, and are superimposed on a light application surface 202 of the micro-mirror-type optical modulation device 200.

Since the projector 2000 of the third embodiment can also decrease ineffective light in the illumination light illuminating the light application surface 202 of the micro-mirror-type optical modulation device 200, the illumination efficiency of the illumination light emitted from the illuminating optical system 100A can be increased. In addition, similarly to the first embodiment, the illuminating optical system 100A includes an integrator optical system composed of the first lens array 150A, the second lens array 160A, and the superimposing lens 170. Therefore, since the light application surface 202 of the micro-mirror-type optical modulation device 200 is uniformly illuminated by the illuminating optical system 100A, an image having uniform brightness can be displayed in addition, the length of the optical path of the illuminating optical system can be shortened as compared to that of the conventional illuminating optical system. This can achieve a reduction in size of the projector as compared to the conventional projector.

Figure 10:
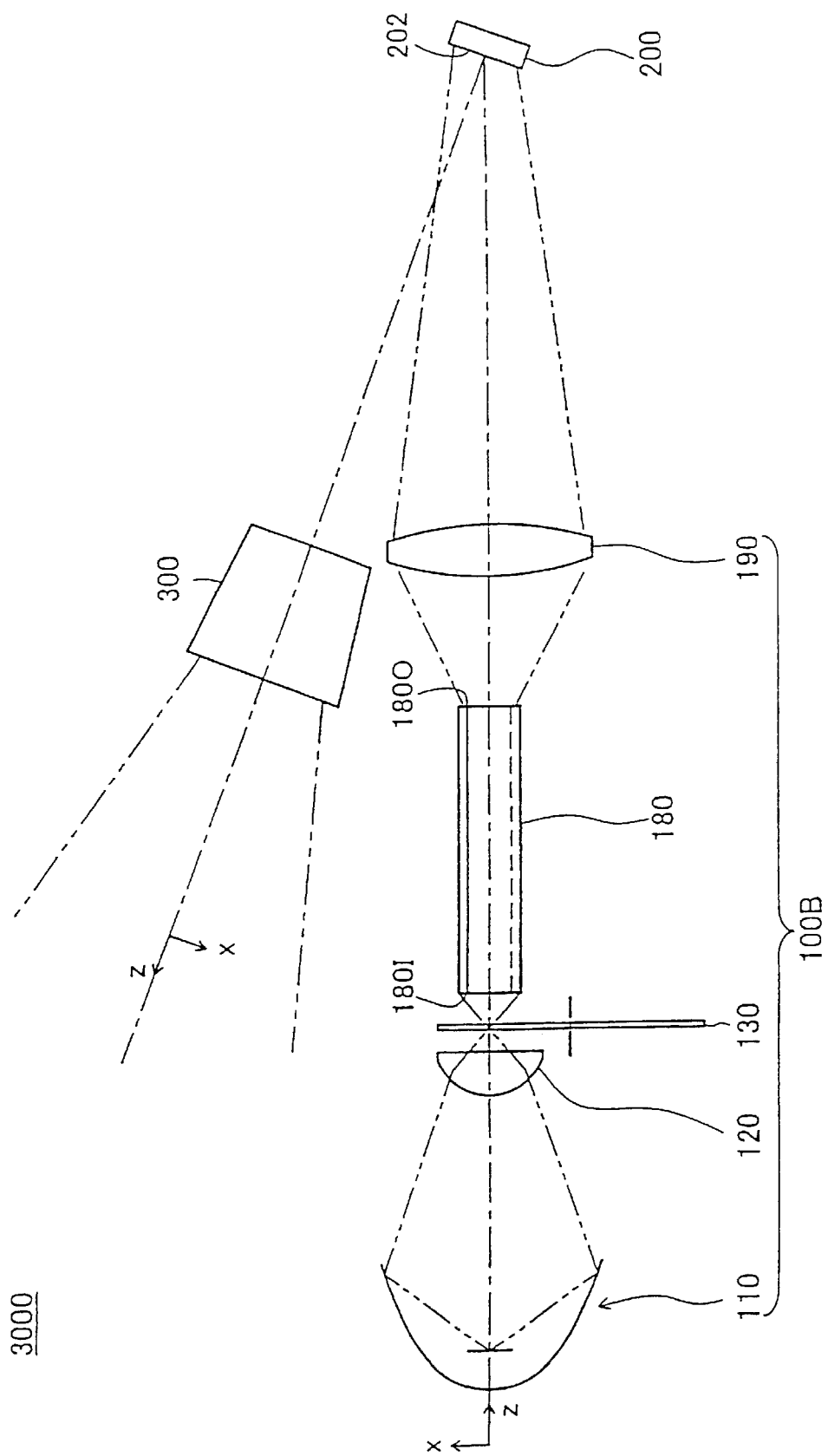
FIG. 10 is a schematic plan view showing a construction of a principal part of a projector according to a fourth embodiment of the present invention.

FIG. 10 is a schematic plan view showing a structure of a principal part of a projector according to a fourth embodiment of the present invention. A projector 3000 includes an illuminating optical system 100B, a micro-mirror-type optical modulation device 200, and a projection lens 300. The difference between the projector 3000 and the projector 1000 (FIG. 5) of the second embodiment is that the illuminating optical system 100 is replaced by the illuminating optical system 100B, and other respects are similar to those of the second embodiment. Constructions similar to those of the second embodiment are indicated by the same reference numerals, and a detailed description thereof will be omitted.

The illuminating optical system 100B includes a light source 110, a first condenser lens 120, a color wheel 130, a light-transmitting rod 180, and a second condenser lens 190. The difference between the illuminating optical system 100B and the illuminating optical system 100 of the second embodiment is that the illuminating optical system 100B includes the light-transmitting rod 180 and the second condenser lens 190 instead of the lens arrays 150 and 160, and the superimposing lens 170.

The illumination light passes through the light-transmitting rod 180 while being repeatedly reflected by the inner surface of the light-transmitting rod 180. Consequently, the light-transmitting rod 180 has the function of emitting light of a uniform illuminance distribution from an emitting-side side surface 180O even if the illuminance distribution of light emitted from the light source 110 is not uniform. That is, the light-transmitting rod 180 has the function of an integrator optical system, similarly to the first and second lens arrays 150 and 160, and the superimposing lens 170 of the illuminating optical system 100. The second condenser lens 190 has the function of forming an image of an emitting surface of the light-transmitting rod 180 on the light illumination surface 202 of the micro-mirror-type optical modulation device 200.

Figure 11:
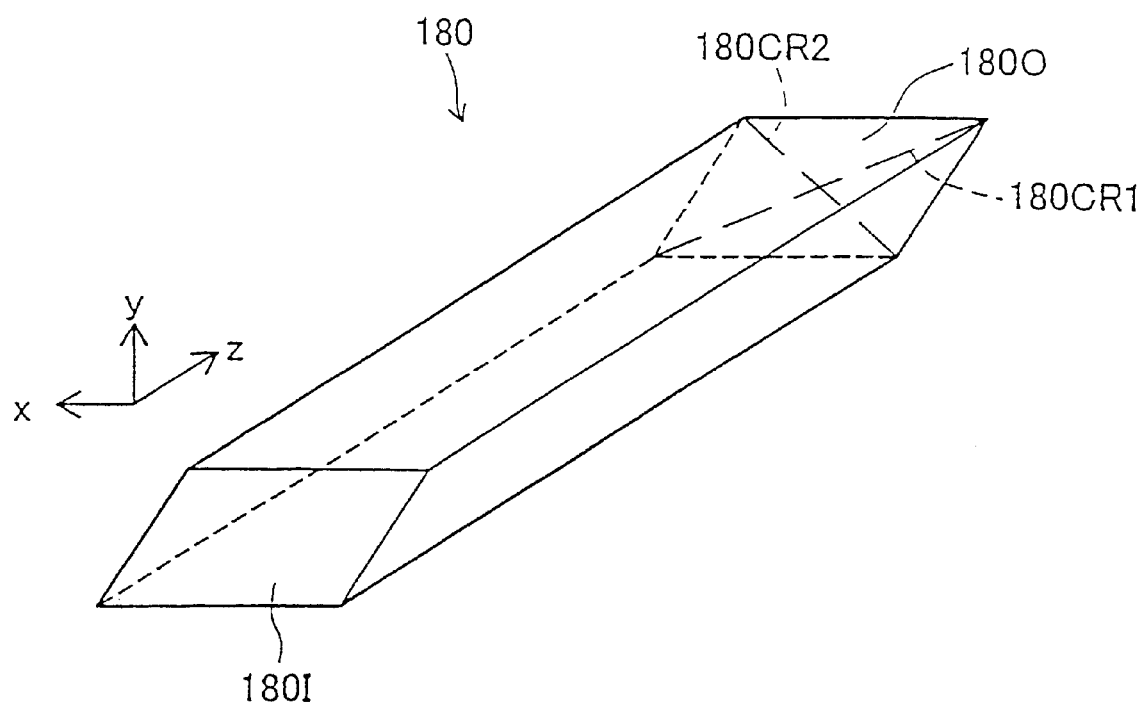
FIG. 11 is a perspective view showing an external appearance of a light-transmitting rod 180.

FIG. 11 is a perspective view showing an external appearance of the light-transmitting rod 180. The light-transmitting rod 180 is a quadrangular prism having an outline of a parallelogram as viewed from the side of the light source 110, similarly to the small lens 152 (FIGS. 6(A)–6(C)) of the first lens array 150. This allows the projector 3000 of the fourth embodiment to decrease ineffective light in the illumination light illuminating the light application surface 202 of the micro-mirror-type optical modulation device 200. Consequently, the illumination efficiency of the illumination light emitted from the illuminating optical system 100B can be increased. In addition, since the light application surface 202 of the micro-mirror-type optical modulation device 200 is uniformly illuminated by the illuminating optical system 100B, an image having uniform brightness can be displayed. In this case, in order to allow the illumination light emitted from the illuminating optical system 100B to be used more effectively, the light-transmitting rod 180 may be actually preferably rotated about the central optical axis thereof to adjust the shape of the illumination region.

In addition, the shape of the light-transmitting rod 180 as viewed from the side of the light source 110 may be similar to the shape of the cross section RI shown in FIG. 8(B). This allows the illumination region FI of the light emitted from the light-transmitting rod 180 to be similar to the outline of the light application surface 202. Consequently, the illumination efficiency owing to the light emitted from the light-transmitting rod 180 can be increased. Incidentally, at least only the outline of the emitting surface of the light-transmitting rod 180 may be similar to the cross section RI shown in FIG. 8(B). That is, when the light emitted from the light-transmitting rod obliquely enters the light application surface at a predetermined angle, the light-transmitting rod may be set so that the ratio of the lengths of two diagonal lines of the quadrilateral illumination region to which the illumination light is applied comes closer to 1 than at least the ratio of the two diagonal lines of the emitting surface of the light-transmitting rod. This can increase the illumination efficiency owing to the light emitted from the light-transmitting rod.

Figure 12:
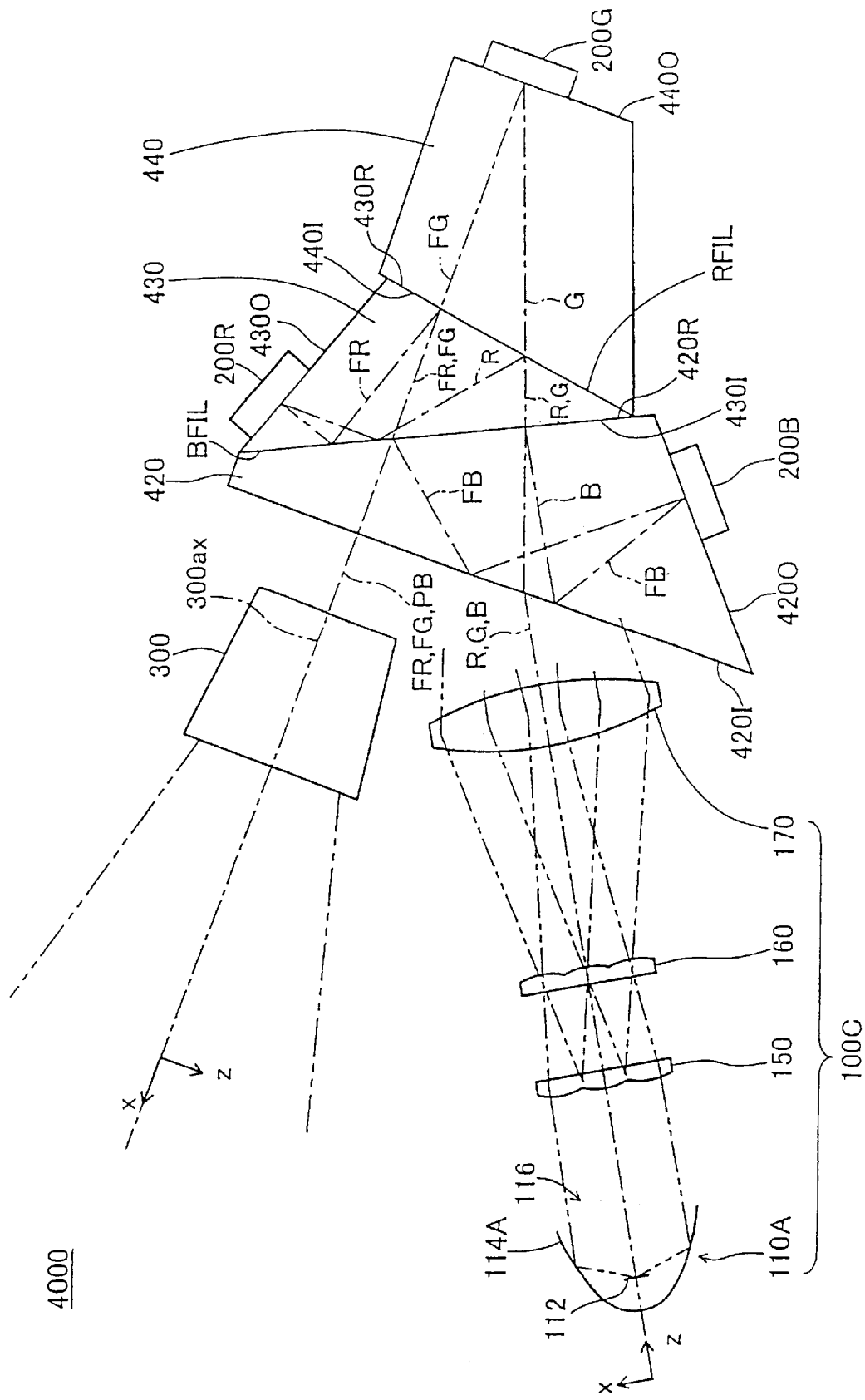
FIG. 12 is a schematic plan view showing a construction of a principal part of a projector according to a fifth embodiment of the present invention.

FIG. 12 is a schematic plan view showing a construction of a principal part of a projector according to a fifth embodiment of the present invention. A projector 4000 includes an illuminating optical system 100C, a color light separating-synthesizing prism 400, three micro-mirror-type optical modulation devices 200R, 200G, and 200B, and a projection lens 300. The projector 4000 is characterized by including the three micro-mirror-type optical modulation devices 200R, 200G, and 200B and the color light separating-synthesizing prism 400.

The illuminating optical system 100C includes a light source 110A, a first lens array 150, a second lens array 160, and a superimposing lens 170. The difference between the illuminating optical system 100C and the illuminating optical system 100 shown in FIG. 5, is that the light source 110 is replaced by the light source 110A for emitting substantially parallel light, and that the first condenser lens 120, the color wheel 130, and the second condenser lens 140 are omitted. Therefore, unlike the illuminating optical system 100 emitting cyclically the red light R, the green light G, and the blue light B, the illuminating optical system 100C emits illumination light including respective color light.

The light source 110A includes a light source lamp 112, and a concave mirror (parabolic concave mirror) 114A in which the concave surface is a parabolic surface, and emits substantially parallel light from an opening 116.

The color light separating-synthesizing prism 400 has a structure such that three prisms 420, 430, and 440 are bonded one to the other. A blue light-reflecting film BFIL is formed between a side surface 420R of a first prism 420 and a side surface 430I of a second prism 430 which are bonded to each other. In addition, a red light-reflecting film RFIL is formed between a side surface 430R of the second prism 430 and a side surface 440I of a third prism 440 which are bonded to each other. These reflecting films BFIL and RFIL are usually formed of a dielectric multilayer film.

On one side surface 430O of side surfaces of the second prism 430 excluding the side surfaces 430I and 430R, there is provided a micro-mirror-type optical modulation device 200R for the red light R. On a side surface 420O opposing the micro-mirror-type optical modulation device 200R of side surfaces of the first prism 420 into which light from the illuminating optical system 100C enters and the side surface 420R bonded to the second prism 430, there is provided a micro-mirror-type optical modulation device 200B for the blue light B. On a side surface 440O of the third prism 440 perpendicular to the central axis 300$ax$ of the projection lens 300, there is provided a micro-mirror-type optical modulation device 200G for the green light G. These micro-mirror-type optical modulation devices 200R, 200G, and 200B are not necessarily provided in contact with the side surfaces 420O, 430O, and 440O.

The light emitted from the illuminating optical system 100C and including the red light R, the green light G, and the blue light B enters from the side surface 420I of the first prism 420 to enter the blue light-reflecting film BFIL. In order to simplify the description, light passing through the color light separating-synthesizing prism 400 and thereafter, only the central light beam (one-dot chain line) is representatively shown in the drawing.

Of the light entered the blue light-reflecting film BFIL, the blue light B is reflected by the blue light-reflecting film BFIL. The blue light B reflected by the BFIL is usually divided into light transmitted by the side surface 420I and light reflected by the side surface 420I. The blue light B reflected by the side surface 420I enters the micro-mirror-type optical modulation device 200B for the blue light B. Incidentally, if the incident angle of the light reflected by the blue light-reflecting film BFIL on the side surface 420I is large, the ratio of the reflected light can be increased. Furthermore, if the incident angle is increased to a critical angle or larger, the light can be totally reflected. Such adjustment of the incident angle can be realized by adjusting angles made by the side surfaces of the prism 420 with one to the other.

The micro-mirror-type optical modulation device 200B forms and emits blue image light FB from the entered blue light B. The blue image light FB emitted from the micro-mirror-type optical modulation device 200B is reflected by the side surface 420I, and is further reflected by the blue light-reflecting film BFIL to be emitted toward the projection lens 300. Similarly to the incident light of the blue light B on the micro-mirror-type optical modulation device 200B, if the incident angle of the blue image light FB emitted from the micro-mirror-type optical modulation device 200B on the side surface 420I is large, the ratio of the reflected light can be increased. Furthermore, if the incident angle is increased to a critical angle or larger, the blue image light FB can be totally reflected.

On the other hand, of the light entered the blue light-reflecting film BFIL, the red light R and the green light G are transmitted by the blue light-reflecting film BFIL to enter the second prism 430. The red light R and the green light G entered the second prism 430 enter the red light-reflecting film RFIL. Of the light entered the red light-reflecting film RFIL, the red light R is reflected by the red light-reflecting film RFIL, and enters the blue light-reflecting film BFIL again. The red light R entered again the blue light-reflecting film BFIL is usually transmitted by the blue light-reflecting film BFIL, however, if the incident angle thereof increases, the light to be reflected is increased, and is totally reflected when the incident angle becomes a critical angle or larger. The side surfaces 420R and 430I of the first and second prisms 420 and 430 on which the blue light-reflecting film BFIL is formed are set so that the red light R entered again the blue light-reflecting film BFIL is reflected. Therefore, the red light R entered again the blue light-reflecting film BFIL is reflected by the blue light-reflecting film BFIL to enter the micro-mirror-type optical modulation device 200R for the red light R.

The micro-mirror-type optical modulation device 200R forms and emits red image light FR from the entered red light R. The red image light FR emitted from the micro-mirror-type optical modulation device 200R enters the blue light-reflecting film BFIL so as to be reflected by the blue light-reflecting film BFIL. The red image light FR reflected by the blue light-reflecting film BFIL is further reflected by the red light-reflecting film RFIL to enter the first prism 420, and is emitted toward the projection lens 300 together with the blue image light FB.

On the other hand, of the light entered the red light-reflecting film RFIL, the green light G is transmitted by the red light-reflecting film RFIL to enter the third prism 440. The green light G entered the third prism 440 passes through the third prism 440 to enter the micro-mirror-type optical modulation device 200G for the green light G from the side surface 440O. The micro-mirror-type optical modulation device 200G forms and emits green image light FG from the entered green light G. The green image light FG emitted from the micro-mirror-type optical modulation device 200G passes through the second prism 430 to enter the first prism 420, and is emitted toward the projection lens 300 together with the red image light FR and the blue image light FB.

By the foregoing description, the red image light FR, the green image light FG, and the blue image light FB representing the color image are emitted from the color light separating-synthesizing prism 400 toward the projection lens 300. This allows the color image to be projected by the projection lens 300.

Incidentally, the light is allowed to enter the micro-mirror-type optical modulation devices 200R, 200G, and 200B at a predetermined angle, respectively, as described with reference to FIGS. 8(A) and 8(B).

Since the projector 4000 of the fifth embodiment can also decrease ineffective light in the illumination light illuminating the light application surfaces 202 of the micro-mirror-type optical modulation devices 200R, 200G, and 200B, the illumination efficiency of the illumination light emitted from the illuminating optical system 100C can be increased. In addition, similarly to the first embodiment, the illuminating optical system 100C includes an integrator optical system composed of the first lens array 150, the second lens array 160, and the superimposing lens 170. Therefore, since the light application surfaces 202 of the micro-mirror-type optical modulation devices 200R, 200G, and 200B are uniformly illuminated by the illuminating optical system 100C, an image having uniform brightness can be displayed. In addition, the length of the optical path of the illuminating optical system can be shortened as compared to that of the conventional illuminating optical system. This can achieve a reduction in size of the projector as compared to the conventional projector.

In addition, the projector 4000 of the fifth embodiment displays a color image by synthesizing the image light emitted from the micro-mirror-type optical modulation devices 200R, 200G, and 200B corresponding to the light of three colors, respectively, so that the projector 4000 can display a color image producing little flickering and having high-precision, as compared to the projectors of the first to fourth embodiments.

Although the example of the color light separating-synthesizing prism 400 of this embodiment formed by the three prisms 420, 430, and 440 is shown, it is not limited thereto. For example, the color light separating-synthesizing prism may be formed by four prisms. That is, the color light separating-synthesizing prism may be a prism as long as it separates light from the illuminating optical system into a plurality of color light to allow each of the separated color light to enter the corresponding plurality of micro-mirror-type optical modulation devices at a predetermined angle, and synthesizes and emits image light of a plurality of colors emitted from the plurality of micro-mirror-type optical modulation devices.

In addition, as the illuminating optical system of this embodiment, the illuminating optical system 100B of the fourth embodiment in which the color wheel 130 is omitted may be used.

The present invention is not limited to the above-described embodiments and modes for carrying out the invention, and can be carried out in various forms without departing from the sprit and scope of the invention.

For example, the DMD used as the micro-mirror-type optical modulation device 200 in the above embodiments has been described in a case where it has a restriction such that the optical path of the illumination light IR projected onto the x-y plane parallel to the light application surface 202 is set to face in the direction diagonally to the lower right of about 45 degrees relative to the x-axis (horizontal axis h), and that the incident angle of the illumination light IR on the light application surface 202 is about 20 degrees in a plane including the optical path of the illumination light IR and perpendicular to the light application surface 202. However, the DMD is not limited thereto. For example, the DMD may have a restriction such that the optical path of the illumination light IR is set to face in the direction having an inclination larger than or smaller than diagonally to the lower right of about 45 degrees relative to the x-axis. In addition, the DMD may have a restriction such that the incident angle of the illumination light IR on the light application surface is smaller or larger than about 20 degrees in a plane including the optical path of the illumination light IR and perpendicular to the light application surface. In this case, the illuminating optical system may include an optical element such that an outline shape of an emitting surface is a quadrilateral having first and second diagonal lines of different lengths (in the above embodiments, the first lens array 150 or a light-transmitting rod 180), and when the illumination light emitted from the optical element obliquely enters the light application surface at a predetermined angle, the quadrilateral may be set so that the ratio of two diagonal lines of a quadrilateral illumination region to which the illumination light is applied comes closer to 1 than the ratio of the lengths of the first and second diagonal lines.

In addition, although the example of the projector using the micro-mirror-type optical modulation device has been described in the above embodiments, the present invention is not limited thereto, and can be applied to a projector using various types of optical modulation devices for controlling the direction of emission of the illumination light applied to each of pixels according to image information to thereby emit image light representing an image.

What is claimed is:

1. A projector for projecting and displaying an image, comprising:
an optical modulation device that controls a direction of emission of illumination light applied to a substantially rectangular light application surface, including a plurality of pixels, for each pixel according to image information to thereby emit image light representing an image;
an illuminating optical system that emits the illumination light so that the central axis of the illumination light applied to the light application surface enters the light application surface at a predetermined angle; and
a projection optical system that projects image light emitted from the optical modulation device, the illuminating optical system comprising:
an optical element such that an outline shape of an emitting surface is a quadrilateral having first and second diagonal lines of different lengths, and when the illumination light emitted from the optical element obliquely enters the light application surface at the predetermined angle, the quadrilateral is set so that the ratio of two diagonal lines of a quadrilateral illumination region to which the illumination light is applied is closer to 1 than the ratio of the lengths of the first and second diagonal lines.

2. The projector according to claim 1, the illuminating optical system comprising:
a light source;
a first lens array having a plurality of first small lenses each being equivalent to the optical element, and dividing the light emitted from the light source into a plurality of partial light beam fluxes; and
a second lens array having a plurality of second small lenses corresponding to the plurality of first small lenses.

3. The projector according to claim 2, each of the plurality of first lenses being a lens having a parallelogram-shaped outline.

4. The projector according to claim 2, at least one of the plurality of first small lenses of the first lens array being a decentering lens.

5. The projector according to claim 3, at least one of the plurality of first small lenses of the first lens array being a decentering lens.

6. The projector according to claim 2, at least one of the plurality of second small lenses of the second lens array being a decentering lens.

7. The projector according to claim 3, at least one of the plurality of second small lenses of the second lens array being a decentering lens.

8. The projector according to claim 4, at least one of the plurality of second small lenses of the second lens array being a decentering lens.

9. The projector according to claim 2, the illuminating optical system including a first condenser lens, a color wheel having a plurality of color filters rotatably formed thereon, and a second condenser lens, respectively arranged between the light source and the first lens array.

10. The projector according to claim 3, the illuminating optical system including a first condenser lens, a color wheel having a plurality of color filters rotatably formed thereon, and a second condenser lens, respectively arranged between the light source and the first lens array.

11. The projector according to claim 4, the illuminating optical system including a first condenser lens, a color wheel having a plurality of color filters rotatably formed thereon, and a second condenser lens, respectively arranged between the light source and the first lens array.

12. The projector according to claim 2, the illuminating optical system including a first condenser lens, a color wheel having a plurality of color filters rotatably formed thereon, and a second condenser lens, respectively arranged between the second lens array and the optical modulation device.

13. The projector according to claim 3, the illuminating optical system including a first condenser lens, a color wheel having a plurality of color filters rotatably formed thereon, and a second condenser lens, respectively arranged between the second lens array and the optical modulation device.

14. The projector according to claim 4, the illuminating optical system including a first condenser lens, a color wheel having a plurality of color filters rotatably formed thereon, and a second condenser lens, respectively arranged between the second lens array and the optical modulation device.

15. The projector according to claim 1, the illuminating optical system comprising:
a light source; and
a light-transmitting rod being the optical element.

* * * * *